US007062246B2

(12) United States Patent
Owen

(10) Patent No.: US 7,062,246 B2
(45) Date of Patent: Jun. 13, 2006

(54) ADAPTIVE ANTENNA ARRAY AND METHOD OF CONTROLLING OPERATION THEREOF

(75) Inventor: Ray Owen, Bath (GB)

(73) Assignee: Motorola. Inc., Schaumburg, IL (US)

(*) Notice: Subject to any disclaimer, the term of this patent is extended or adjusted under 35 U.S.C. 154(b) by 640 days.

(21) Appl. No.: 10/297,553

(22) PCT Filed: Jun. 5, 2001

(86) PCT No.: PCT/EP01/06440

§ 371 (c)(1),
(2), (4) Date: Dec. 6, 2002

(87) PCT Pub. No.: WO01/95427

PCT Pub. Date: Dec. 13, 2001

(65) Prior Publication Data

US 2004/0204098 A1     Oct. 14, 2004

(51) Int. Cl.
*H04B 1/06* (2006.01)
*H04B 7/00* (2006.01)

(52) U.S. Cl. .............................. 455/277.1; 455/562.1; 455/277.2; 455/452.2

(58) Field of Classification Search ............ 455/277.1, 455/277.2, 551, 602.1, 575.7, 82, 66.1, 63.4, 455/25, 450, 452.1, 452.2, 509, 517, 67.13; 370/335, 342

See application file for complete search history.

(56) References Cited

U.S. PATENT DOCUMENTS

| 5,754,139 | A  | * | 5/1998  | Turcotte et al. ............. 342/373 |
| 5,969,689 | A  |   | 10/1999 | Martek et al. |
| 6,108,323 | A  | * | 8/2000  | Gray .......................... 370/335 |
| 6,181,276 | B1 | * | 1/2001  | Schlekewey et al. ....... 342/372 |
| 6,496,142 | B1 | * | 12/2002 | Iinuma ....................... 342/368 |

FOREIGN PATENT DOCUMENTS

| GB | 2 337 171 A | 11/1999 |
| WO | WO 99 25142 A | 5/1999 |

OTHER PUBLICATIONS

Liu Yuan An et al. "The Capacity Increase of CDMA by the Interface Suppression for Multibeam Application." Asia-Pacific Conference on Environmental Electromagnetics CEEM May 2000, pp 86-90.

* cited by examiner

*Primary Examiner*—Tilahun Gesesse
*Assistant Examiner*—John J. Lee
(74) *Attorney, Agent, or Firm*—Brian M. Mancini; Lalita W. Pace

(57) ABSTRACT

An adaptive antenna array (14) includes a muliplicity of antenna elements (12a–12k, 48a–48k) responsive to uplink communications (16a–16k) and arranged to support directional-orientated downlink communication to subscriber units (18). The adaptive antenna array (14) is operationally responsive to a signal processor (28) that co-operates with direction of arrival estimation logic (36) to assess an angle of arrival of uplink communications incident to the array. To avoid inter-cell interference, especially during early stages of a call, the signal processor operates to ensure that a wide area downlink beam (108) is provided for a downlink path to an addressed subscriber unit. With time and/or with reported (68,84) downlink quality of service (QoS) metrics, the signal processor (28) regulates (74, 92, 96) a width of the downlink beam by altering the number of antenna elements used to support the downlink beam, thereby altering the downlink beam aperture. Generally, with time, more antenna elements (92) are used and so the beam is narrowed, although in-call fluctuations in downlink quality of service are dynamically addressed by the signal processor (28) by either narrowing or broadening the width of the downlink beam by respectively switching antenna elements (12a–12k, 48a–48k) into (92) or out (96) of the adaptive antenna array (14), as shown in FIG. 3.

18 Claims, 4 Drawing Sheets

ADAPTIVE ANTENNA ARRAY AND METHOD OF CONTROLLING OPERATION THEREOF

BACKGROUND TO THE INVENTION

This invention relates to an adaptive antenna array and a method of controlling the operation thereof. The present invention is particularly, but not exclusively, applicable to a method and apparatus for maximising Quality of Service (QoS) to a subscriber unit in a mobile wireless telecommunications system. More particularly, the present invention is applicable to operational use of an adaptive antenna array during the establishment of a connection to a subscriber unit, although it can be applied dynamically in an in-call scenario.

SUMMARY OF THE PRIOR ART

Adaptive antenna beam forming architectures provide a directional downlink beam based on information derived from uplink beam measurements. An attainable degree of prediction accuracy of a downlink estimate limits the capacity and frequency re-use that is achievable by any adaptive antenna network since an explicit downlink channel estimate is not available to the base station at which the antenna network is located. More especially, the uplink channel and the downlink channel may be instantaneously, or for short periods, subject to different propagation conditions (such as multi-path propagation, fading and the like). Consequently, any estimate pertaining to an angular/directional displacement of a subscriber unit relative to an antenna array that is reliant upon such measured channel information will appear different. In practice, therefore, the estimated direction of a subscriber unit (e.g. a mobile station) has an associated uplink to downlink directional error ($\theta_e$) because the uplink and the downlink are not subject to the same propagation conditions when the uplink and downlink carrier frequencies are separated.

With time, however, a statistical averaging effect between the uplink and downlink causes a convergence of direction/angle of arrival estimates derived from physically distinct paths (typically supported by different carrier frequencies). Indeed, in most existing systems and in view of this convergence phenomenon, the uplink directional estimate is used throughout the call in view of the uncertainty in the existence of any correlation between the uplink and downlink estimates.

Generally, in order to obtain a downlink directional estimate, an uplink signal is processed in such a manner that certain parameters, such as channel (particularly carrier) to interference ratios (C/(I+N)), are optimised. This directional processing may be achieved by selectively combining all of the different antenna elements in the array until an optimum combination is found. Certain preferred or pre-set algorithm combinations, known to the skilled addressee, are used for determining the principle direction ($\theta_u$) of the uplink for the mobile station in question. Then, once the principle direction, i.e. the angle of arrival, is established, energy in the downlink beam is steered towards an estimated downlink direction ($\theta_d$) of the subscriber unit, regardless of the subscriber's actual direction relative to the antenna array. Steering therefore hopes to benefit from sufficient statistical averaging in the uplink and downlink multi-path for the physical and radio frequency directions to be equivalent.

Steering may be achieved by determining the fixed beam for a Butler beam-former, or by determining the adaptive weights for a baseband beam-former.

By way of more specific example, a direction-finding search regime in the base station looks to an instantaneously or time-averaged measured uplink direction metric to use as a basis for a downlink directional estimate. One problem with this procedure is that it can lead to a dramatic alteration of the estimated direction in successive principle downlink estimates. More specifically, attempts to track a moving mobile unit by using such instantaneous snapshots can be ineffective and/or complex (i.e. processing intensive) because the uplink to downlink error is a function of the speed and propagation conditions of the mobile unit.

Although adaptive antennas, in general, reduce co-channel interference in an antenna network when the uplink and downlink directional estimates are the same as the downlink direction, any error between the actual downlink direction and the downlink estimate causes a significant reduction in the C/(I+N) and an increase in overall system interference. In a worst case scenario, a narrow beam downlink carrier could be aligned in an opposing direction to the actual position of the subscriber unit. In this instance, the subscriber unit (in convention fashion) provides a report to the base station indicating poor QoS (or failure to receive an expected transmission). Since the system generally operates on an interference limited basis, the base station increases power in a subsequent narrow beam transmission to the subscriber unit; this increase in power is perceived/designed to improve QoS to the subscriber unit. The increased power used in the narrow beam therefore has increased reach and so the carrier frequency used in the downlink causes adjacent splutter (i.e. co-channel and/or adjacent channel interference) in an adjacent cell.

Even with a now increased level of power in the narrow beam down-link transmission, the addressed subscriber unit may still register an unacceptably low QoS and so the subscriber again effectively requests improved service by reporting the low QoS (be this received signal strength, bit error rate or the like). With the base station unable to resolve physical displacement of the addressed subscriber unit (even inferred through timing advance), the base station again increases power in its subsequent downlink transmission to the subscriber unit. Moreover, this increased power downlink transmission is likely to still be directionally incorrect since directional convergence between the uplink and downlink estimates may not yet have taken place. The increased power in the carrier reaches yet further into at least the next adjacent cell and perhaps beyond. Therefore, at some point, downlink power concentrated in an originally narrow beam becomes a significant problem because, with ever-increasing radial displacement, the area covered by the narrow beam increases. System interference therefore increases because the power within the narrow beam acts to offset the affects of signal attenuation.

In other words, with the downlink direction wrongly estimated, operation of the system to maximise/improve QoS results in more power being steered in an incorrect direction, thereby increasing system interference (as a whole) until downlink and uplink directional estimation convergence occurs. At this point of convergence, the base station transceiver (BTS) will only need to transmit a lower power for the mobile to achieve its desired QoS; this is because of aperture gain.

The problems associated with interference in cellular communications systems and the issues to be considered in a cellular system employing frequency reuse are generally described in the text book "The Global System for Mobile Communications" by Michel Mouly and Marie-Bernadette Pautet, pages 599 to 601.

SUMMARY OF THE INVENTION

According to a first aspect of the invention there is provided an adaptive antenna arrangement for generating a downlink beam, the adaptive antenna arrangement comprising: a plurality of antenna elements; and a controller for controlling formation of the downlink beam, the controller characterised in that the controller is arranged to adjust, with time, a number of antenna elements active in the formation of the downlink beam thereby to vary, in use, a beam width of the downlink beam.

In a preferred embodiment, the controller is operationally responsive to quality of service metrics of the downlink beam, and wherein the controller is arranged to vary the beam width depending upon the quality of service metrics. Moreover, generally, the controller is arranged to vary the beam width depending upon relative variations in the quality of service metrics.

In another embodiment the controller is arranged to vary the beam width and direction thereof in response to convergence between angle of arrival estimates for downlink and uplink paths.

As will be understood, particular features of the various preferred embodiments may be actioned independently in or combination to provide enhanced operation and an improved decision-making process.

In a second aspect of the present invention there is provided an adaptive antenna network providing downlink communication to a mobile station, the adaptive antenna network comprising: two or more antenna element adapted to be switched in and out of the adaptive antenna network as required; control logic for switching antenna elements in and out of the adaptive antenna network; a downlink communications channel for downlink communication from the antenna network to the mobile station, which channel can be measured by one or more Quality of Service (QoS) metrics and which channel is constrained to operate within predetermined QoS parameters; wherein the mobile station measures a predetermined QoS metric of the downlink communication and returns a QoS measure to the control logic; and wherein the control logic switches at least one antenna element, if available, into the adaptive antenna network if the QoS measure is within the predetermined QoS parameters or switches at least one antenna element, if available, out of the adaptive antenna network if the QoS measure is outside the predetermined QoS parameters;

In a third aspect of the present invention there is provided a cellular communication system comprising: a base station having control logic responsible for establishing and maintaining a downlink channel resource; an antenna array comprising a plurality of antenna elements, the antenna array and the plurality of antenna elements operationally responsive to the control logic, the plurality of antenna elements, in use, radiating at least one directional-orientated downlink channel resource therefrom and wherein formation of the at least one directional-orientated downlink channel resource is controlled by the control logic; the cellular communication system characterised in that: the control logic includes means for adjusting, with time, a number of antenna elements active in the formation of the at least one directional-orientated downlink channel resource, thereby to vary, in use, a beam width of the at least one directional-orientated downlink channel resource.

In a further aspect of the present invention there is provided a controller for an adaptive antenna having a plurality of antenna elements configurable, in use, to form a directional downlink beam in response to the controller, the controller comprising: means for controlling formation of the down ink beam; and means for adjusting, with time, a number of antenna elements active in the formation of the downlink beam thereby to vary, in use, a beam width of the downlink beam.

In another aspect of the present invention there is provided a method of controlling downlink communication from an adaptive antenna to a subscriber unit, the adaptive antenna having a plurality of antenna elements the method comprising: controlling dispersion of a downlink beam by adjusting, with time, a number of antenna elements active in the formation of the downlink beam to vary, in use, a beam width of the downlink beam.

In yet another aspect of the present invention there is provided a method of providing downlink communication between an adaptive antenna and a mobile unit of a cellular communication system, the adaptive antenna having two or more switchable antenna elements and control logic for actuating switching of said antenna elements in and out of the adaptive antenna network, the method comprising: establishing a downlink communications channel for downlink communication from the antenna network to the mobile unit and constraining the downlink communication to operate within predetermined Quality of Service (QoS) parameters; measuring at the mobile station a predetermined QoS metric of the downlink communication and returning a QoS measure to the control logic; and switching at least one antenna element, if available, into the adaptive antenna network if the QoS measure is within the predetermined QoS parameters or switching at least one antenna element, if available, out of the adaptive antenna network if the QoS measure is outside the predetermined QoS parameters.

In a particular embodiment, an adaptive antenna array includes a multiplicity of antenna elements responsive to uplink communications and arranged to support directional-orientated downlink communication to subscriber units. The adaptive antenna array is operationally responsive to a signal processor that co-operates with direction of arrival estimation logic to assess an angle of arrival of uplink communications incident to the array. To avoid inter-cell interference, especially during early stages of a call, the signal processor operates to ensure that a wide area downlink beam is provided for a downlink path to an addressed subscriber unit. With time and/or with reported downlink quality of service (QoS) metrics, the signal processor regulates a width of the downlink beam by altering the number of antenna elements used to support the downlink beam, thereby altering the downlink beam aperture. Generally, with time, more antenna elements are used and so the beam is narrowed, although in-call fluctuations in downlink quality of service are dynamically addressed by the signal processor by either narrowing or broadening the width of the downlink beam by respectively switching antenna elements into or out of the adaptive antenna array.

Advantageously, a preferred embodiment of the present invention addresses interference problems particularly prevalent during call establishment procedures to a subscriber unit (especially a mobile unit) from an adaptive antenna array. The present invention effectively ensures a guaranteed minimum quality of service (QoS) at call establishment by providing a wide area beam having a power level appropriate to the coverage area served by the adaptive antenna array. The beam is then narrowed with time and/or QoS to move the system to an interference-limited environment whilst seeking a guaranteed quality of service for the subscriber unit.

The present invention provides better translation of the uplink estimate to the downlink estimate by assuming a worst case scenario when the downlink communication is initiated. An advantage of the invention is that, depending upon the changing propagation conditions due, for example, to the movement of a mobile station, the downlink may be continually monitored and, consequently, optimisation of the downlink communication (in terms of beam width and power control) may be managed dynamically (based, for example, on QoS) during a call.

The process of the present invention beneficially ensures that the measured QoS service(s) used as a metric is (are) maximised through varying the antenna aperture size, rather than the more time consuming process of trying to track or find the best downlink direction. The present invention therefore provides a very simple tracking algorithm that is significantly more stabile than a conventional searching/tracking algorithm. In addition, the algorithm of the preferred embodiment of the present invention uses an average estimate of the downlink channel, since the beam is merely broadened or narrowed, and smoothes out the dramatically altering estimates which may be obtained with a tracking algorithm.

Another advantage of the invention arises in situations where otherwise co-channel interference may impact upon the downlink communication QoS. Where all base stations employ adaptive antenna arrays and networks according to the invention, all the base stations trade off the channel against the interference. Increasing the aperture of the beam reduces the chances of encountering directional estimation errors but increases the interference seen by the co-channel mobile.

BRIEF DESCRIPTION OF THE DRAWINGS

Embodiments of the invention are described below, by way of example only, with reference to the following drawings, in which.

DETAILED DESCRIPTION OF A PREFERRED EMBODIMENT

Figure 1:
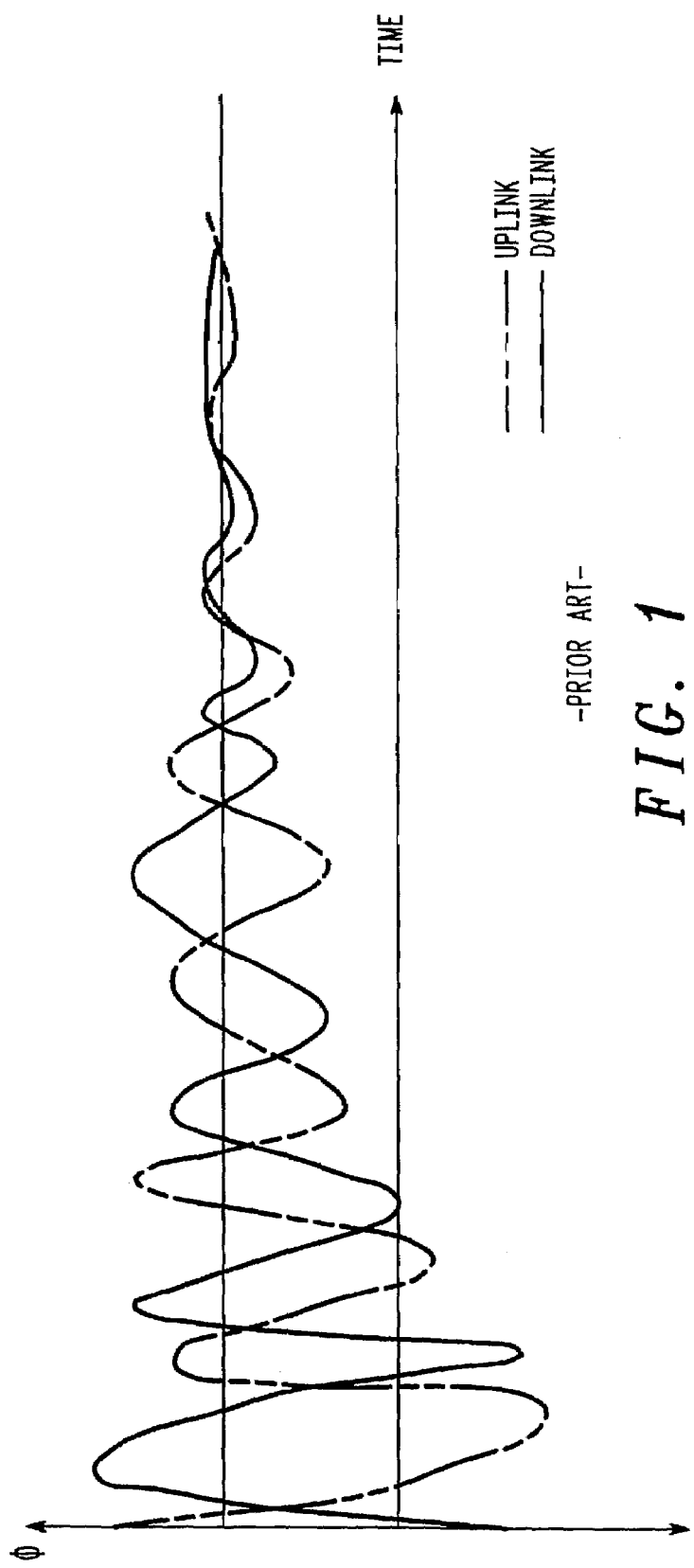
FIG. 1 illustrates variations in uplink directional estimate and the downlink directional estimate with time.

Turning to FIG. 1, there is shown a graphical representation of how directional estimates for uplink and downlink paths vary, and ultimately converge, with time. The x-axis (i.e. the abscissa) represents an averaging period and the y-axis (i.e. the ordinate) represents estimates of the uplink and downlink principal direction angle, φ. As can be seen, for very short averaging times (that is, the points towards the left hand side of the x-axis of the figure), the uplink and downlink directional estimates can be widely different. These differences arise from the different physical (and essentially instantaneous) propagation paths from the base station (i.e. the antenna array) to a subscriber unit and vice versa, with these differing propagation paths partially attributable to any difference in carrier frequency used to support the uplink and downlink channels. As either the averaging period or the time is increased (illustrated by movement towards the right-hand side of the x-axis of FIG. 1), the average directional estimates for the uplink and downlink start converging toward a stable direction. That is to say, the uplink and downlink directions are the same if averaged over sufficient time, and therefore address (and hence to smooth out) variations in the principal direction angle caused by, for example, any duplex frequency difference in a frequency division multiplexed (FDM) system or the like.

Figure 2:
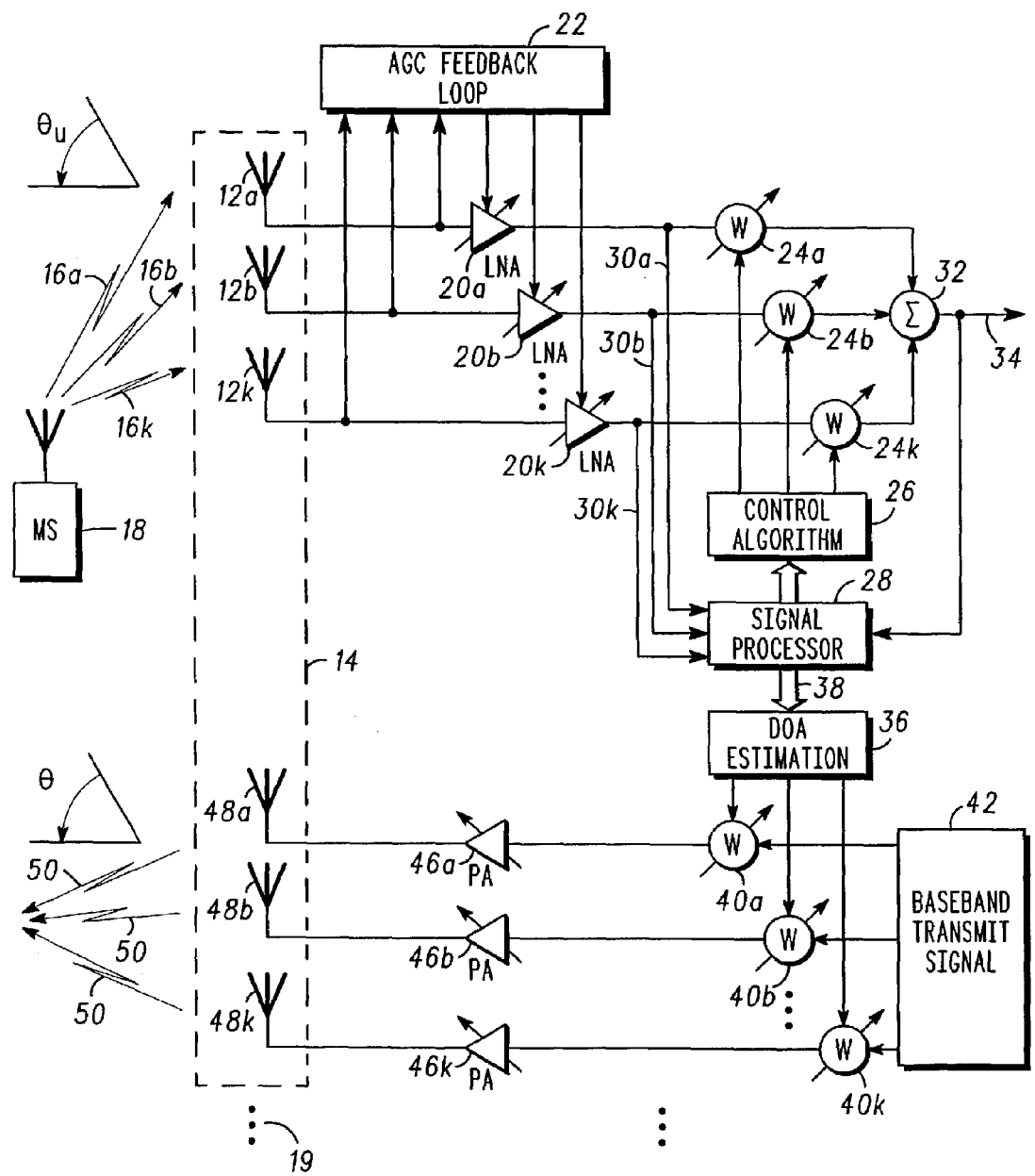
FIG. 2 shows a block diagram of an adaptive antenna network according to a preferred embodiment of the invention.

FIG. 2 is a block diagram of an adaptive antenna network 10 according to a preferred embodiment of the invention. A plurality of antenna elements 12a–12k, preferably physically separated by half-wavelengths for maximum aperture gain, make up a portion of the adaptive antenna array 14 responsive to uplink transmissions 16a–16k emanating from a subscriber unit 18, such as a mobile station or a terminal. Of course, the antenna elements 12a–12k may contemporaneously service multiple subscriber units in a time division or code division basis, with a single subscriber 18 unit shown for exemplary purposes and clarity of the figure. The number of antenna elements with the adaptive antenna array 14 is arbitrary. The plurality of antenna elements 12a–12k are generally associated or collocated with a base station 19.

Uplink signals 16a–16k received at the plurality of antenna elements 12a–12k are passed through low noise amplifiers (LNA) 20a–20k, with individual LNAs generally associated with specific antenna elements. An automatic gain control (AGC) feedback loop, responsive to recovered uplink signals from the antenna elements 12a–12k and coupled to the LNAs 20a–20k for operational control thereof, is arranged to adjust gain within each LNA, thereby ensuring that a maximum dynamic range of the antenna elements 12a–12k is utilised. Following the LNAs 20a–20k, complex-weighting elements 24a–24k are arranged to apply complex weights to each uplink signal from each antenna element 12a–12k. The weights are derived from a control algorithm 26 operationally responsive to a signal processor 28 that itself receives gain adjusted versions 30a–30k of the uplink transmissions 16a–16k. Weight-corrected signals from each of the complex weighting elements 24a–24k are then linearly summed together in summing unit 32. As will be understood, the weights have a phase and angle such that a clear direction $\theta_u$ can be established for the uplink direction by the base station 19.

The signal processor 28 is also coupled to receive a resultant signal 34 that is output from the summing unit 32. The signal processor 28 and control algorithm 30 co-operate to estimate, using known methodologies, the uplink direction ($\theta_u$) for the subscriber unit 18 within a cell served by the base station 19 at which the adaptive antenna network 10 is located. In particular, the signal processor 26 and control algorithm may look to a feedback mechanism and a determination of signal-to-noise levels for the various incident uplink signals 16a–16k in order to calculate new weights for the complex weighting elements 24a–24k. Furthermore, the control algorithm 26 may utilise a raw measure of the signal to noise ratio of each of the input antenna elements 12a–12k (i.e. before application of complex weighting), thereby yielding an internal measure of performance for the applied complex weights.

A direction of arrival (DOA) estimation unit 36 uses a conventional output metric 38 (readily appreciated by the skilled addressee) from the signal processor 28 to determine/estimate a direction of arrival angle φ of significant energy in the uplink signals 16a–16k. The directional of arrival angle φ is used to alter (complex phase and angle information of) downlink weighting elements 40a–40k, and thereby to steer transmitted signal energy (i.e. a baseband transmit signal 42) in a predetermined direction in the downlink. The baseband transmit signal 42, such as voice and/or data, passes through these downlink weighting elements 40a–40k before being amplified in power amplifiers 46a–46k that are generally individually associated with specific downlink antenna elements 48a–48k in a transmit portion of the adaptive antenna array 14.

Antenna elements (12a–12k and 48a–48k) associated with receive and transmit paths can be either separate, dedicated elements (as illustrated in FIG. 2) or shared (common) antenna elements coupled to respective transmit and receive chains through a duplex filter (not shown).

When a call to or from the mobile is initiated, or when another type of communication between the base station and the mobile station is required, an equivalent downlink direction ($\theta_d$) is assumed to be the same as (i.e. complementary to) the uplink angle of arrival $\phi$. Now, according to a preferred embodiment of the present invention, whenever a downlink communication is initiated, the number of antenna elements included (from the array 14 to support the downlink channel 50) is small (for example one or two) giving a wide beam aperture. The use of a wide beam (and preferably also a predetermined power setting that significantly curtails signal propagation beyond a serving cell boundary) therefore initially provides a system minimised interference environment whilst generally ensuring a minimum QoS to an addressed subscriber unit. The wide beam may be omni-directional or sectorized. With the passage of time and preferably subject to an assessment of QoS to the subscriber unit (reported directly from downlink measurements taken by the addressed subscriber unit), the width of the beam is narrowed to focus the downlink transmission in the direction of the subscriber unit. Furthermore, it will be recalled that, with the passage of time, convergence between directional estimates derived from the uplink and downlink occurs, and so beam width narrowing/alteration can occur on the basis of both convergence and QoS indications, if desired.

A metric used to measure the Quality of Service provided by the downlink is preferably C/(I+N), but a number of other QoS metrics, such as the Frame Erasure Rate (FER) and bit error rate (BER), may be used (either individually or in combination).

According to a preferred embodiment of the present invention, if the QoS metric (such as C/(I+N) in the measured downlink) is determined to be within a threshold of a previously set budget, the number of antenna elements used in the adaptive array 14 can be increased by one or more (subject, perhaps, to a level of confidence associated with the direction), thereby narrowing the beam width. Since narrowing of the beam knowingly occurs based on confidence in the direction of arrival of uplink signals and/or QoS at the subscriber unit, the subscriber unit is likely to be serviceable within the narrowed beam and is unlikely to demand an increased power budget for downlink transmissions. Consequently, the system of the preferred embodiment will not be tasked to provide excessive (or increasing) power within a narrow beam width, and so the possibility of inter-cell interference is generally avoided.

The budget by which decisions are made may be set by the system operator or be specified in a technical standard used to define an operating protocol for the system.

Clearly, the process of adding at least one antenna element assumes that, at initiation (i.e. call set-up), the addressed subscriber unit is ostensibly within the beam aperture; this would also be the case with an initial omni-directional transmission.

Conversely, should a sectorised approach to beam width be initially adopted, then it is possible that an addressed subscriber unit, although contactable, is actually outside of the sectorised beam. In this instance, rather than increase power into the narrow beam, the preferred embodiment increases beam width by decreasing the number of antenna elements 12a–12k used for the downlink channel. With repeated taking of QoS measurements, the process of adding an antenna element is repeated until such time as the C/(I+N), or other metric, improves to an acceptable level. The beam width is then preferably narrowed with time in view of convergence affects between uplink and downlink directional estimates.

Alternatively or additionally, in the event of initial use of a variable beam-width, one could use a more critical approach to uplink to downlink angle of arrival (AOA) translation. If large AOA estimation errors occur then, in one embodiment of the present invention, the use of the variable beam width can, in fact, compensate for the AOA error to avoid having to support an increase in downlink power for an acceptable QoS.

The C/(I+N) value may be measured by the mobile station at predetermined intervals during the communication. If the downlink C/(I+N) value moves below a predetermined threshold, the number of antenna elements in the array may be reduced by one (or more), thereby increasing the beam width. Likewise, if the C/(I+N) value (or other metric) improves, the number of antenna elements may be increased by one. In this manner, the aperture of the beam is dynamically maintained in an in-call scenario and such that the beam width is as narrow as the predetermined QoS parameters of the system allows.

Selective active engagement/disengagement of the antenna elements 48a–48k in the formation of the downlink beam can be controlled by the use of processor-controlled switches within each path to the antenna element, thereby providing absolute isolation. Preferably, switching of the antenna elements 48a–48k into and out of the array 14 is achieved by actively managing the downlink weighting elements such as to prevent the baseband transmit signal from being radiated from particular selected ones of the antenna elements 48a–48k.

In generality, the signal process 28 and the various control and estimation algorithms (26, 36) provide the necessary functionality to resolve management of the antenna array, as will be understood.

Figure 3:
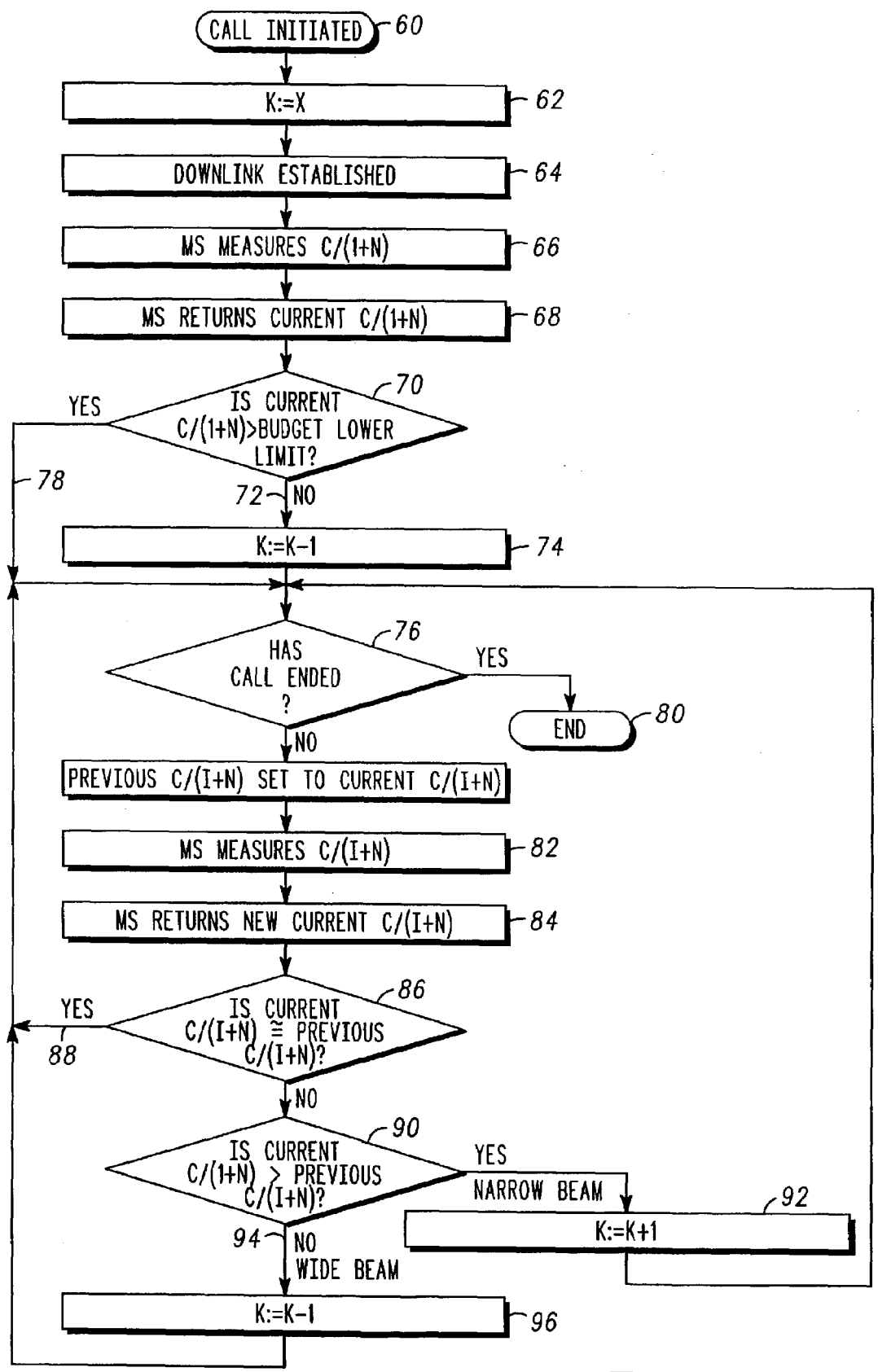
FIG. 3 shows a flow chart of preferred steps taken by control logic when a communication is initiated.

FIG. 3 describes a preferred operating methodology in which antenna elements are added and subtracted from the antenna array 14 based, principally, on QoS metric measurements. The methodology is generally applicable to both an in-call scenario and call establishment according to the preferred embodiments of the present invention, and in this respect some of the process steps will be unnecessary dependent upon the initial premise on which the system is set-up.

FIG. 3 is a flow chart illustrating the steps taken by control logic (of either a base station transceiver or a base station sub-system) to manage an adaptive antenna array. The call is initiated 60 with the adaptive array utilising 62 "x" antenna elements (where x is a positive integer). A downlink 64 is therefore established. The mobile station performs some form a metric analysis 66 on the downlink, e.g. C/(I+N), and returns 68 the metric analysis to the base station for use thereby. Following return of the metric analysis, the base station determines 68 whether the metric analysis is better or worse than a lower operating limit of a QoS budget. In the negative 70 (i.e. the QoS is below a predetermined level), the number of antenna elements is decreased 74 (by at least one), thereby widening the beam and flow proceeds to a decision block that determines whether the call (or the communication) is on-going. Clearly, if it is established that the call or connection has terminated, then the process ends 80. Steps 72 and 74 may be omitted in a system initially using a suitably wide-area (sectorised or omni-directional) downlink transmission. An affirmative path 78 from decision block 70 results in a consolidation of process flows at block 76.

In an on-going call/communication situation, further metric analysis 82 is (preferably) undertaken by the subscriber unit and reported 84 to the base station, although it is contemplated that channel performance could be inferred from operational parameters at the base station. A comparison between a previous metric and a subsequent metric is undertaken to assess whether there has been any significant change. If the metrics are relatively constant/approximate 88, then flow returns to decision block 76, else an assessment 90 is made as to whether the most recent metric is better than the previous metric. If there is an effective improvement in the metric (whereby the subscriber may be experiencing an improved QoS), then the system may operate to increase 92 the number of antenna elements and hence to focus/narrow the downlink beam. Of course, the improvement in the metric could also be attributable to convergence of directional estimates, although the effect of narrowing the beam is the same regardless. Should the metric be assessed to be worse 94, then the system preferably operates to decrease 96 the number of antenna elements and hence to widen the downlink beam (rather than to increase down-link power, although this is clearly an option). Flow subsequent to either of process steps 92 and 96 then returns to block 76 for determination of whether the call (or the communication, e.g. a control channel transmission) is on going.

In way of brief summary, a searching algorithm may be employed within the present invention (preferably in-call, although equally applicable to call establishment procedures) to direct an increasingly narrow aperture downlink beam to be moved through progressively varying angles and beam width, from an uplink directional estimate, by adding and subtracting certain antenna elements within an adaptive array. Alternatively, a wide beam may be narrowed, with the passage of time, to the uplink angle of arrival estimate in view of convergence between the uplink and downlink directional estimates.

Figure 4:
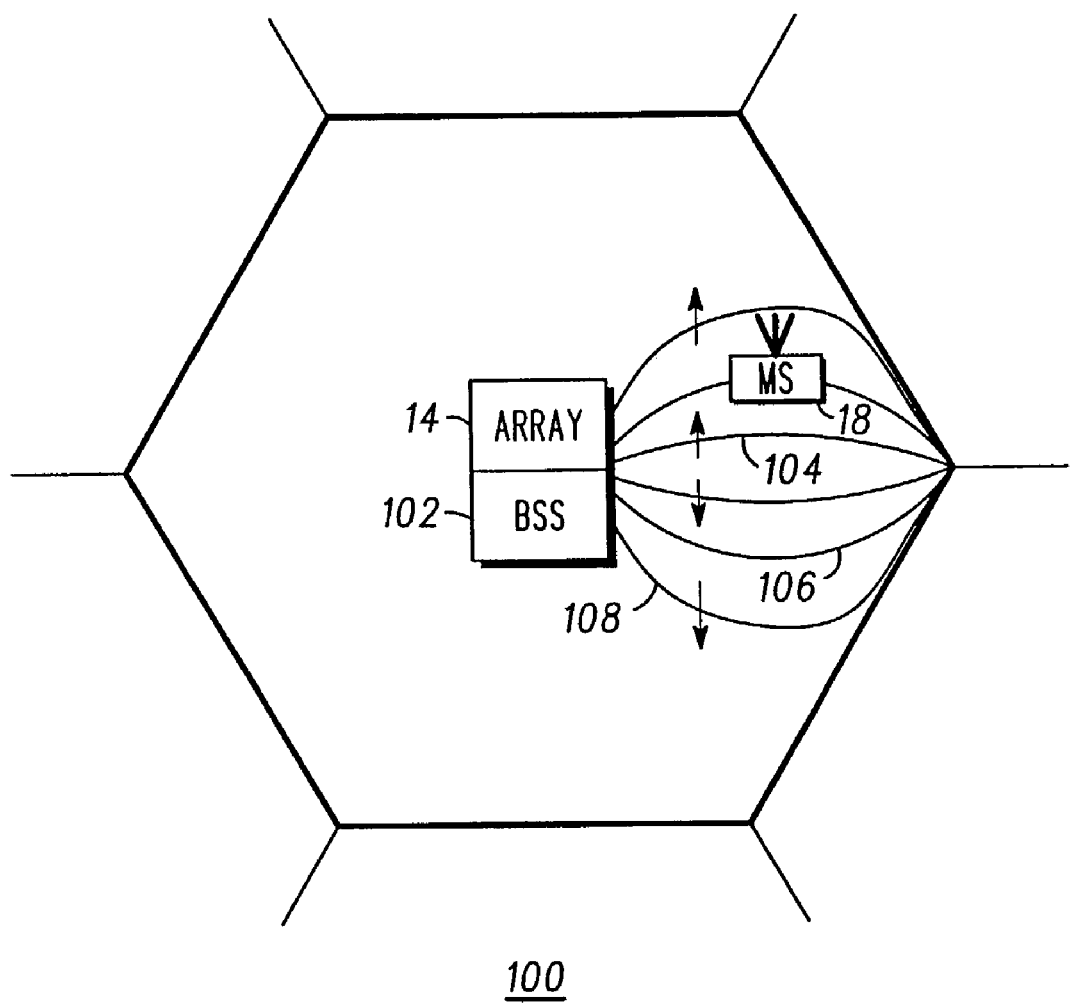
FIG. 4 shows a diagram of beam oscillation.

Beam oscillation is diagrammatically shown in FIG. 4 in which a cellular system 100 is shown to include an adaptive antenna array 14 (and associated base site control equipment 102) servicing a subscriber unit 18. Three downlink transmit lobes 102–106 are shown, with directional arrows on the narrowest lobe 104 and the widest lobe 108 indicating that there needs to be an variation in the number of antenna elements used in the antenna array 14 to service the subscriber unit 18 (at least initially during call set-up). In all likelihood, with time and hence directional estimation convergence between the uplink, the narrowest beam will ultimately be correctly aligned on the subscriber unit to minimise system interference.

It will, of course, be appreciated that the above description has been given by way of example only and that modifications may be made within the scope of the present invention. Whilst the preferred embodiment has been described in relation to an adaptive antenna network, the underlying control logic could be provided in the form of a computer program product, such as in the form of a CD-ROM or other software agent that can upgrade existing antenna sites.

The present invention can be applied to both traffic and control channels, with the traffic being voice, data or a combination thereof, and is not limited to any particular form of communication protocol or air-interface.

The invention claimed is:

1. An adaptive antenna network providing downlink communication to a mobile station, the adaptive antenna network comprising:
   two or more antenna element adapted to be switched in and out of the adaptive antenna network as required;
   control logic for switching antenna elements in and out of the adaptive antenna network;
   a downlink communications channel for downlink communication from the antenna network to the mobile station, which channel can be measured by one or more Quality of Service (QoS) metrics and which channel is constrained to operate within predetermined QoS parameters;
   wherein the mobile station measures a predetermined QoS metric of the downlink communication and returns a QoS measure to the control logic; and
   wherein the control logic switches at least one antenna element, if available, into the adaptive antenna network if the QoS measure is within the predetermined QoS parameters or switches at least one antenna element, if available, out of the adaptive antenna network if the QoS measure is outside the predetermined QoS pammeters.

2. The adaptive antenna network of claim 1, wherein the control logic is arranged to vary the beam width depending upon the quality of service metrics.

3. The adaptive antenna network of claim 2, wherein the control logic is arranged to vary the beam width depending upon relative variations in the quality of service metrics.

4. The adaptive antenna network of claim 1, wherein the controller is arranged to vary the beam width and direction thereof in response to convergence between angle of arrival estimates for downlink and uplink paths.

5. The adaptive antenna arrangement of claim 4, wherein the adaptive antenna arrangement, in use, initially forms an omni-direction beam.

6. The adaptive antenna arrangement of claim 1, further comprising a direction of arrival estimator and wherein the adaptive antenna arrangement, in use, initially forms a sectorised beam based on an uplink angle of arrival estimate.

7. The adaptive antenna arrangement of claim 6, wherein the sectorised beam compensates for errors in directional estimation.

8. The adaptive antenna network as claimed in claim 1, wherein one Quality of Service (QoS) metric measured is the channel to interference ratio C/(I+N).

9. A cellular communication system comprising:
   a base station having control logic responsible for establishing and maintaining a downlink channel resource;
   an antenna array comprising a plurality of antenna elements, the antenna array and the plurality of antenna elements operationally responsive to the control logic, the plurality of antenna elements, in use, radiating at least one directional-orientated downlink channel resource therefrom and wherein formation of the at least one directional-orientated downlink channel resource is controlled by the control logic; and wherein the control logic includes means for adjusting, with time, a number of antenna elements active in the formation of the at least one directional-orientated downlink channel resource, thereby to vary, in use, a beam width of the at least one directional-orientated downlink channel resource.

10. The cellular communication system of claim 9, wherein the control logic includes means for contrasting quality of service metrics, and wherein the control logic is arranged to vary the beam width depending upon the quality of service metrics.

11. A method of providing downlink communication between an adaptive antenna and a mobile unit of a cellular communication system, the adaptive antenna having two or more switchable antenna elements and control logic for actuating switching of said antenna elements in and out of the adaptive antenna network, the method comprising the steps of:
    establishing a downlink communications channel for downlink communication from the antenna network to the mobile unit and constraining the downlink communication to operate within predetermined Quality of Service (QoS) parameters;
    measuring at the mobile station a predetermined QoS metric of the downlink communication and returning a QoS measure to the control logic; and
    switching at least one antenna element, if available, into the adaptive antenna network if the QoS measure is within the predetermined QoS parameters or switching at least one antenna element, if available, out of the adaptive antenna network if the QoS measure is outside the predetermined QoS parameters.

12. The method of claim 11, further comprising varying the beam width depending upon quality of service metrics measured by the mobile unit.

13. The method of claim 12, further comprising varying the beam width depending upon relative variations in the quality of service metrics.

14. The method of claim 13, further comprising varying the beam width and direction thereof in response to convergence between angle of arrival estimates associated with downlink and uplink paths.

15. The method of claim any of claim 14, further comprising:
    initially generating an omni-direction downlink beam at call establishment; and
    subsequently narrowing the downlink beam.

16. The method of claim any of claim 15, further comprising:
    estimating an angle of arrival;
    initially forming a sectorised beam based on an uplink angle of arrival estimate.

17. The method of claim 16, wherein the sectorised beam compensates for errors in directional estimation.

18. The method as claimed in claim 11, wherein one Quality of Service (QoS) metric measured is the channel to interference ratio C/(I+N).

* * * * *